United States Patent
Matthey et al.

(10) Patent No.: US 12,024,666 B2
(45) Date of Patent: Jul. 2, 2024

(54) SIC-BOUND HARD MATERIAL PARTICLES, POROUS COMPONENT FORMED WITH SIC-BOUND DIAMOND PARTICLES, METHOD OF PRODUCING SAME AND USE THEREOF

(71) Applicant: Fraunhofer-Gesellschaft Zur Foederung Der Angewandten Forschung E.V., Munich (DE)

(72) Inventors: Bjoern Matthey, Dredsen (DE); Steffen Kunze, Dresden (DE); Mathias Herrmann, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 820 days.

(21) Appl. No.: 16/980,570

(22) PCT Filed: Mar. 14, 2019

(86) PCT No.: PCT/EP2019/056457
§ 371 (c)(1),
(2) Date: Sep. 14, 2020

(87) PCT Pub. No.: WO2019/175333
PCT Pub. Date: Sep. 19, 2019

(65) Prior Publication Data
US 2021/0002534 A1 Jan. 7, 2021

(30) Foreign Application Priority Data
Mar. 14, 2018 (DE) .................. 10 2018 203 882.1

(51) Int. Cl.
C09K 3/14 (2006.01)
C04B 35/52 (2006.01)
(Continued)

(52) U.S. Cl.
CPC ............ *C09K 3/1436* (2013.01); *C04B 35/52* (2013.01); *C04B 35/573* (2013.01);
(Continued)

(58) Field of Classification Search
CPC ............... C09K 3/1436; C04B 35/573; C04B 35/62695; C04B 35/62839; C04B 35/65;
(Continued)

(56) References Cited

U.S. PATENT DOCUMENTS

| 6,179,886 B1 * | 1/2001 | Gordeev | ............... C04B 37/026 |
| | | | 51/293 |
| 2008/0202821 A1 * | 8/2008 | McClain | ................. C22C 1/101 |
| | | | 175/434 |

(Continued)

FOREIGN PATENT DOCUMENTS

| DE | 19844397 | 3/2000 |
| DE | 69808324 | 5/2003 |

(Continued)

OTHER PUBLICATIONS

International Search Report.
(Continued)

*Primary Examiner* — James A Fiorito
*Assistant Examiner* — Ross J Christie
(74) *Attorney, Agent, or Firm* — Jacobson Holman PLLC

(57) ABSTRACT

The invention relates to SiC-bound diamond hard material particles, a porous component formed with SiC-bound diamond particles, methods for producing same and the use thereof. Diamond hard material particles and components have a composition of 30 vol. % to 65 vol. % diamond, 70 vol % to 35 vol. % SiC and 0 to 30 vol. % Si, and a component has a porosity in the range of 10% to 40%

9 Claims, 2 Drawing Sheets

(51) Int. Cl.
*C04B 35/573* (2006.01)
*C04B 35/626* (2006.01)
*C04B 35/628* (2006.01)
*C04B 35/65* (2006.01)
*C04B 38/06* (2006.01)

(52) U.S. Cl.
CPC .. *C04B 35/62695* (2013.01); *C04B 35/62839* (2013.01); *C04B 35/65* (2013.01); *C04B 38/067* (2013.01); *C04B 2235/3826* (2013.01); *C04B 2235/427* (2013.01); *C04B 2235/428* (2013.01); *C04B 2235/5436* (2013.01)

(58) Field of Classification Search
CPC .......... C04B 38/067; C04B 2235/3826; C04B 2235/427; C04B 2235/428; C04B 2235/5436
See application file for complete search history.

(56) References Cited

U.S. PATENT DOCUMENTS

| | | | |
|---|---|---|---|
| 2009/0120009 A1* | 5/2009 | Sung | C09K 3/1409 |
| | | | 51/307 |
| 2013/0167447 A1 | 7/2013 | Webb et al. | |
| 2014/0007515 A1 | 1/2014 | Sigalas et al. | |
| 2017/0361424 A1* | 12/2017 | Wang | B22F 1/0545 |

FOREIGN PATENT DOCUMENTS

| | | |
|---|---|---|
| DE | 102011109573 | 10/2012 |
| DE | 102015206241 | 10/2016 |
| JP | 3119098 | 10/2000 |
| WO | 2009013713 | 1/2009 |
| WO | WO-2009013713 A2 * | 1/2009 ............... B24D 3/14 |
| WO | 2011146697 | 11/2011 |
| WO | 2016123321 | 8/2016 |

OTHER PUBLICATIONS

German Office Action.
Mlungwane et al. The low-pressure infiltration of diamond by silicon to form diamond-silicon carbide composites. Journal of the European Ceramic Society, vol. 28, No. 1, Jan. 2008, pp. 321-326.

* cited by examiner

SIC-BOUND HARD MATERIAL PARTICLES, POROUS COMPONENT FORMED WITH SIC-BOUND DIAMOND PARTICLES, METHOD OF PRODUCING SAME AND USE THEREOF

BACKGROUND OF THE INVENTION

The invention relates to SiC-bound hard diamond material particles, to a porous component formed with SiC-bound diamond particles, to processes for production thereof and to the use thereof.

Typically, the wide variety of different hard material particles are embedded alone or in the form of a granular material or in a material matrix for a wide variety of different applications, especially for material-removing machining in the form of grinding. Among the hard material particles used are diamond particles that are known to have very high hardness. Diamond alone, however, can have disadvantages in various applications that can be disadvantageous, for example, in the event of thermal cycling stresses, or binding characteristics in a matrix material. Moreover, diamond particles can also break down chemically under particular environmental conditions or become detached from a matrix or a material composite.

SUMMARY OF THE INVENTION

It is therefore an object of the invention to provide granules or components that have improved properties over straight granules formed from diamond particles and can be matched to particular fields of use.

This object is achieved in accordance with the invention by hard material particles, a component, a production process, for components as set forth in the claims.

The invention can provide super-hard abrasive materials composed of SiC-bound diamond.

The hard material particles of the invention have been formed from SiC-bound diamond and may be obtained in particle sizes between 20 µm and 5 mm. The hard material particles are formed with 30% by volume-65% by volume of diamond, 70% by volume-35% by volume of SiC and 0% by volume to 30% by volume of Si. Preference is given to 40% by volume-60% by volume of diamond, 60% by volume-40% by volume of SiC and 2% by volume to 20% by volume of Si.

The particle size distribution of the diamond particles may be multimodal in order to increase the packing density of mutually bonded diamond particles in hard material particles.

An advantageous fine fraction is one having 0.1 to 0.3 times the size of the diameter of a coarse diamond particle fraction and having a proportion of 5% by volume-50% by volume of the coarse particle size fraction.

Advantageously, 5% by volume-30% by volume of the coarse particle size fraction should be used in a multimodal particle size fraction.

Diamond particles are cohesively bonded here to the SiC and Si formed in the thermal treatment at surface regions in individual hard material particles.

At the same time, the entire surface regions of diamond particles need not be, and advantageously should not be, cohesively bonded to the SiC formed by reaction. As a result, it is effectively possible to form intended fracture sites where there can be a fracture under sufficiently high mechanical stress. For example, in the case of machining by grinding, diamond particles and/or regions of SiC can break out of the cohesive composite, which can have an advantageous effect in machining by grinding.

The median particle size $d_{50}$ of diamond particles in the material should be kept within the range of 5 µm to 500 µm, preferably 5 µm-100 µm. The particle size distribution of the diamond particles in a hard material particle may be multimodal in order to increase the packing density. It is thus possible to use at least two different particle size fractions.

It is particularly advantageous for there to be one fine and one coarser particle size fraction of diamond particles; the finer particle size fraction should have 0.1 to 0.3 times the size of the diameter of the coarse particle size fraction and be present in a hard material particle with a proportion of 5% by volume-50% by volume of the coarse particle size fraction. It is very particularly advantageous to observe 5% by volume-30% by volume of the coarse particle size fraction.

The procedure in the production of the granular material is to use a suspension including diamond particles and an organic binder, or diamond particles which with a suspension or a dispersion including an organic binder. In the granulating and drying process, the diamond grains are partly or fully coated. As a result, they are held together in granular form.

In the case of thermal treatment in an oxygen-free atmosphere, pyrolysis is effected, in which the constituents of the organic binder are broken down thermally and carbon formed in situ from the organic binder in the course of pyrolysis is deposited in vitreous form on surfaces of diamond particles.

A silicization is conducted during this thermal treatment or in a subsequent second thermal treatment with added pulverulent silicon. The pulverulent silicon can be added prior to the silicization.

Silicon carbide is formed by chemical reaction with the carbon deposited on surfaces of diamond particles, so as to obtain hard material particles formed by 30% by volume-65% by volume of diamond, 70% by volume-35% by volume of SiC and 0% to 30% by volume of Si.

The diamond granules obtained should be mixed with pulverulent silicon and/or optionally additionally with particulate spacers such that the granules are destroyed only to a minimal degree, if at all, and they separate the diamond particles at least in regions. This simplifies or enables individualization of the SiC-bound hard diamond material particles thus obtained without intensive grinding or the like, which would lead to severe wear on plant.

The organic binder and/or the amount thereof with which the diamond particles are coated or which is present in the suspension should be chosen such that the organic binder is used as carbon source with a proportion between 1.5% by mass and 20% by mass relative to the total mass of diamond particles used. The SiC utilized for the binding of the diamond particles is obtained essentially from chemical reaction of the carbon released in the pyrolysis with silicon. This improves the properties of the hard material particles thus obtained, as follows:
  elevated thermal stability,
  controllable fracture characteristics of the hard material particles (if diamonds containing relatively large residues of catalyst (Fe, Ni) are used, these are internally weakened and it is possible to control the breakup of the diamond particles under use conditions by the variation of the silicization temperature between 1425° C. and 1650° C. (higher temperatures lead to fracture under lower load)

by extending the hold time in the silicization at temperatures of >1525° C., it is possible to influence the incorporation of the diamond particles in the SiC matrix. Relatively long periods of higher temperatures lead to more rapid breakout of the diamond particles under severe tribological stress. In the case of silicization at 1650° C. for a hold time of 20 min, interfaces of non-diamond carbon form in a thickness of >50 nm. The result of this is that the diamond particles are released when the SiC bond has partly broken. In the case of silicization at <=1600° C. and silicization times of <60 min, there is firm incorporation of the diamond particles, such that there is no break out of the diamond particles even when the hard SiC bond has partly broken. Integral Knoop hardnesses of >40-45 GPa may be measured for such hard material particles.

The associated reduced strength of the bond between the diamond particles and the SiC, and also the Si, sometimes has a positive effect when the hard material particles are used in machining by grinding.

As well as the binding to the SiC formed by reaction, the diamond particles in hard material particles may additionally also be cohesively bonded to Si that has not been reactively converted. However, this free Si is typically separated from the diamond by a nm to µm-thick SiC layer.

Advantageously, not more than 90%, particularly advantageously not more than 80%, of the surfaces of the diamond particles should be cohesively bonded to SiC and Si. For this purpose, the amount and type of organic binder and silicon added may be chosen correspondingly. The organic binder here forms the main carbon source for the reactive in situ formation of the SiC. In addition, there is a surface reaction of the diamond particles with the Si during the infiltration to give SiC. This assures firm chemical attachment of the diamond particles to the SiC. The carbon from the binder reduces the proportion of reacting diamond, and it is thus possible to achieve higher diamond contents.

The reaction preferably results in the formation of β—SiC. Any SiC (usually inexpensive α-SiC) mixed into the granular material may also be incorporated as well into the SiC matrix/network formed. But this reduces the density of the diamond particles, and so it generally brings no advantage to mix this in. For specific applications, especially to reduce the price, however, α-SiC could be added.

The hard material particles can be produced by granulation with minimal proportions of organic binder and solvent content by means of a pan granulator or, for example, in an Eirich mixer or by means of fluidized bed or spray granulation. Another possibility is compression of the granular material and then subsequent comminution. This can achieve higher diamond particle densities.

The organic binder which is pyrolyzed in inert atmosphere at 400° C. 1400° C. may lead to a content of non-diamond carbon of 1.5% by mass-20% by mass, based on the diamond content in the pyrolyzed state.

The particle size distribution of the individual silicized hard material particles can be refined by means of classification/comminution, for example by sieving, and matched to the requirements. Prior to classification, it is possible to perform mechanical individualization, for example with a jaw crusher.

The organic binder that may be used in the invention may be an organic chemical compound or a mixture selected from polyvinyl alcohol, polyvinyl acetate, polyethylene glycol, a sugar, cellulose, and phenolic resins. The term "binder" here is a collective term for the organic components utilized, since the binding between the diamond particles in the granulated state is the main function. The organic components may also, as well as the actual binder, contain dispersants, wetting agents, plasticizers (e.g. PEG), defoamers.

Hard material particles are infiltrated with silicon. For this purpose, the granular material may be added and mixed with diamond particles and the organic binder formed granular material before or preferably after the pyrolysis in the thermal treatment with Si powder of median particle size $d_{50}$ in the range of 5 µm-1000 µm, preferably in the range of 10 µm-150 µm, and in this range with a volume of 10% by volume-200% by volume, preferably 20% by volume-100% by volume, of the content of diamond particles.

The silicon powder should preferably have a particle size between 5 µm and twice the particle size of the granules of the granular material formed with diamond particles and the organic binder, in order to assure sufficient distance between the individual granules. The distances are beneficial for problem-free comminution after silicization. The silicon content should not exceed twice that necessary to perform the reactive binding. A better amount is 1.5 times or even just 1.1 times.

The infiltration may be performed in the thermal treatment in which the pyrolysis is also conducted, or else in a second, subsequently conducted thermal treatment. In the further thermal treatment, a maximum temperature of 1650° C. and more preferably vacuum conditions should be observed.

It is also possible to utilize coarse silicon powder. In that case, however, a particle size fraction of fine silicon powder in the range of 5 µm-20 µm with a volume of 10% by volume-30% by volume of the granular SiC diamond material should additionally be utilized. This fine fraction enables, by virtue of the remaining porous oxide/SiC surface layers of the original Si grains, the option of problem-free individualization of the SiC-bound hard diamond material particles.

In order to be able to more easily individualize the SiC-bound hard diamond material particles after the silicization, it is possible to mix in components that are not easily wetted by Si, do not form any alloy with Si and do not react with Si as spacers prior to the silicization or pyrolysis. Such chemical elements or compounds may be utilized for coating in order to minimize any firm bonding (sticking) of the granules to one another. For this purpose, chemical elements or compounds may preferably be selected from BN, $Si_3N_4$, AlN, $Al_2O_3$, $SiO_2$, $ZrO_2$ and a nitride, carbide of the transition metals, especially of groups 4 and 5 of the Periodic Table (especially of Ti, Zr, Hf, V, Nb).

This method is particularly effective if the Si needed for reactive binding has already been added to the granular material and does not have to be added externally to the granular material during the silicization.

Since SiC or SiC—$SiO_2$ shells can remain around the silicon particles, the silicized granule accumulations can be comminuted without difficulty and then classified (e.g. jaw crusher, sieve, wind-sifter, etc.), when the Si particles have been mixed into the granular material.

The resultant SiC-bound hard material particles can still be agglomerated after the silicization. They should therefore generally be mechanically comminuted and then classified (e.g. jaw crusher, ball mill, sieve, wind-sifter, etc.). By virtue of the measures described above, this is possible even without major abrasion and wear on the plant.

In addition, excess Si can be leached out partly or completely with alkaline solutions (e.g. 20% NaOH) at room temperature or elevated temperatures in the range of 60° C.

up to the boiling point. This may also lead to individualization of the hard material particles.

The resultant hard material particles may be utilized as abrasives, but they may also be introduced into other matrix materials as hard material particles and hence novel plastic-, metal- or ceramic-bound abrasive media/wheels may be produced.

The SiC-bound hard diamond material particles may be processed, for example, with a glass matrix or else metal matrix to give abrasive wheels. The hard materials of the invention have not only the advantage of better abrasive characteristics but also the advantage of greater thermal stability compared to pure diamond.

SiC-bound hard diamond material particles can be introduced into a matrix material in accordance with typical ceramic technologies. These hard material particles may also be mixed separately into a dried granular material prior to shaping. They may alternatively be supplied to the starting composition and then processed further by appropriate standard ceramic shaping technologies, for example by pelletizing, pressing, slip casting, extruding, injection molding, hot casting, or by means of additive manufacturing methods.

Since the SiC-bound hard diamond material particles consist essentially of diamond and SiC, they have different fracture characteristics than pure granular diamond materials. As a result, the abrasive wheels that may be formed with a granular material of the invention are more effective under particular conditions than those formed with pure diamond.

The fracture characteristics of the SiC-bound hard diamond material particles may be adjusted. In addition, different diamond qualities may be used in order likewise to be able to adjust the fracture characteristics of the hard material particles.

The binding between diamond particles and SiC can be adjusted by means of thermal treatment. When diamond particles containing relatively large residues of catalyst (Fe, Ni) are used, they may be weakened internally, and it is possible by varying the silicization temperature between 1425° C. and 1650° C. to control the breakup of the diamonds under use conditions (higher temperatures lead to fracture under lower load).

By extending the hold time in the silicization at temperatures of >1550° C., it is possible to influence the binding of the diamond particles in the SiC matrix. Longer times and higher temperatures lead to faster breakout of the diamond particles under severe tribological stress. In the case of silicization at 1650° C. with a hold time of 20 min, interfaces of non-diamond carbon can form in a thickness of >50 nm. The effect of this is that diamond particles are released when the SiC bond has been partly broken. In the case of silicization <=1600° C. and silicization times of <60 min, there is firm incorporation of the diamond particles, such that no diamond particles can fall out, even when the SiC bond has been partly broken. Integral Knoop hardnesses of >40 GPa 45 GPa may be measured for such hard material particles.

For particular grinding applications, SiC-bound hard diamond material particles of defined shape are advantageous. By means of ceramic shaping methods, such as, in particular, extrusion or casting methods or pressing, the particles may be brought into a desired shape, preferably spherical, cylindrical, prismatic, pyramidal, especially by extrusion or by casting methods, prior to the silicization.

The hard material particles may also be used as admixture to other materials in order to increase stiffness, hardness or wear resistance. This can be utilized, for example, in metals as particle reinforcement or in other materials that are to have a collapse-inhibiting function (e.g. concrete) or in order to create extremely long-life rough surfaces, in order, for example, to prevent slippage under wet conditions in safety-relevant regions.

By means of the silicization, it is possible to enclose an agglomerate formed with diamond particles with SiC. As a result, an abrasive grain has high thermal stability, or it is very much more stable on interaction with oxidic or metallic matrices. This improves the incorporation of the hard material particles into critical matrix materials, for example cemented carbide, $Al_2O_3$, etc.

Hard material particles that are hollow on the inside can be produced by applying a suspension including not only diamond particles but also an organic binder to silicon particles having a particle size in the range of 50 μm 150 μm, or the use of a suspension including not only diamond particles, organic binder, but also pulverulent polymeric material that breaks down under thermal treatment, preferably polyurethane, followed by thermal treatment in which there is pyrolysis and reactive formation of SiC. Polystyrene, polymethylmethacrylate, polyethylene or polypropylene or starch may also preferably be added as polymeric materials. Polymeric material should be added with a median particle size $d_{50}$ in the range of 30 μm to 100 μm prior to the thermal treatment and be pyrolyzed in the thermal treatment.

This form of hard material particles also has advantageous properties in use for machining by grinding, since the strength of the cohesive bond between diamond particles and especially the SiC and possibly with the Si is also reduced in this way. This can achieve improved breakout of diamond particles during machining by grinding, which has a favorable effect owing to the formation of new edges. The effect is similar to that in the case of utilization of reduced surface regions where cohesive bonds have been formed, as already described.

It is alternatively possible to directly produce abrasive wheels as porous components from SiC-bound diamond. Such components have a porosity in the range of 10% to 40%, preferably between 10% and 30%, an average pore size between 10 μm-100 μm, preferably between 20 μm-50 μm. They consist of 30% by volume-65% by volume of diamond, 70% by volume-35% by volume of SiC and 1% by volume to 30% by volume of Si, preferably of 40% by volume-60% by volume of diamond, 60% by volume-40% by volume of SiC and 2% by volume to 20% by volume of Si, and the diamond particles present have an average particle size in the range of 5 μm to 500 μm, preferably in the range of 30 μm-100 μm, more preferably >50 μm-200 μm.

A material formed with the SiC-bound diamond particles may contain, for example, 20% by volume-50% by volume of at least one soft phase that undergoes primary wear in the event of tribological or abrasive stress and hence creates pores in the material, may be formed with an average particle size of 10 μm-50 μm, preferably 15 μm-30 μm or 10 μm-20 μm of hard material particles. This execution is especially advantageous for abrasive wheels made of SiC-bound diamond.

This/these soft phase(s) having lower mechanical strength compared to the diamond particles and the SiC may be non-diamond carbon, BN, $Si_3N_4$, which may also be partly sintered, $Al_2O_3$, or transition alumina, impervious or porous glass beads, high-melting silicide or boride (e.g. $TiSi_2$, $MoSi_2$, $WSi_2$, $TiB_2$, $W_2B_5$, $WB_2$, $ZrO_2$) with a wide variety of different dopants, at least one other high-melting oxide or silicate (e.g. MgO, talc, . . . ), at least one transition metal carbide or oxycarbide or else nitride or boride, especially of group 4 and 5 of the Periodic Table (especially of Ti, Zr, Hf, V, Nb). A porosity may also be regarded as a phase in this context, since it can lead the same result in the product.

Preferably, 20% by volume-30% by volume of this/these phase(s) (in addition to diamond; SiC and Si) may be present in a material.

A component may also be produced in such a way that diamond particles are mixed with SiC, with an organic binder and with particles of an organic substance, preferably pulverulent polymer as pore former, especially polystyrene, polymethylmethacrylate, polyurethane, polyethylene or polypropylene or starch, preferably with a median particle size $d_{50}$ in the range of 30 μm to 100 μm, prior to the thermal treatment and shaped by a shaping process. This shaped body is then subjected to a thermal treatment in an oxygen-free atmosphere, in which the organic constituents are pyrolyzed and carbon formed in situ from the organic binder in the course of pyrolysis is deposited in vitreous form on surfaces of diamond particles. During this thermal treatment or in a subsequent second thermal treatment with externally supplied, preferably pulverulent, silicon, a silicization is conducted. Silicon carbide is formed here by chemical reaction with the carbon deposited on surfaces of diamond particles and the diamond, such that the component material has a composition of 30% by volume-65% by volume of diamond, 70% by volume-35% by volume of SiC and 0% to 30% by volume of Si, and a porosity in the range of 10%-40%.

Particles of an organic substance, especially pulverulent polymer, should be added here with a proportion in the range of 20% by volume to 40% by volume.

Silicon powder having a median particle size $d_{50}$ between 20 μm-100 μm may be mixed into the starting material for production of the components prior to the shaping, and the particle size thereof is maintained during the shaping and hence pores are formed during the silicization.

Otherwise, in the production of the components, the same parameters and procedures may be chosen as may also be used for production of hard material particles, which relates especially to features of claims 5 to 7, and in part of claims 8 to 11 and 13.

In order to produce abrasive wheels, the granular material, prior to the silicization, preferably also prior to the pyrolysis, should be subjected to a shaping process, for example pressing, isostatic pressing, extruding or casting. This is then followed by silicization, which leads to three-dimensional binding of the diamond particles into a SiC matrix/framework, as in the above-described hard material particles within the particles. The pore formers or the soft phase that undergoes primary wear under tribological or abrasive stress and hence creates pores in the material may be introduced into a matrix material in accordance with typical ceramic technologies. These may also be mixed separately into a dried granular material prior to the pressing.

It is possible to supply silicon or silicide particles to the granular material formed at least with diamond particles and organic binder in a number and size corresponding to the number of desired pores. Capillary forces during a heat treatment, preferably under reduced pressure, can then result in in situ infiltration of the material, and there is no need to add silicon externally.

The pores or the faster-wearing particles that replace them may be generated as follows:

1) It is possible to supply pore formers (organic particles, for example PMMA, starch, polypropylene, polystyrene), which undergo pyrolysis and can form impervious surface layers during the silicization that prevent silicon infiltration or surfaces that are not easily wetted by Si, for example BN or $SiO_2$.
2) Si or silicide particles may be supplied to the granular material in a number and size corresponding to the number of pores. As a result of capillary forces, the workpiece is then infiltrated in situ, preferably under reduced pressure, during a heat treatment, and there is no need to add Si externally.
3) Faster-wearing particles can be introduced into the component material in accordance with typical ceramic technologies. These particles may be mixed in in dry form, for example, between the granulated diamond material or hard material particles, or else into the starting suspension. This is followed by shaping and further processing by means of pyrolysis/silicization.
4) It is also possible to mix the SiC-bound hard diamond material particles of the invention in finished form with diamond particles and binder, and then to shape them and then to correspondingly pyrolyze and silicize them. The Si needed for the purpose may be supplied externally or else introduced directly into the diamond particle-binder mixture, suspension. In the latter case, the Si particle sizes should correspond roughly to the desired pore size.

In addition, it is possible to partly or fully leach out excess Si with alkaline solutions (e.g. 20% NaOH) at room temperature or elevated temperatures (60° C.-boiling temperature), in order thus to clear the pores.

In the same way, it is possible to achieve porosity of SiC-bound hard material particles.

The SiC-bound diamond granules and porous components of the invention may also be used in multilayer form on/in a component. A substrate composed of SSiC or SiSiC or else short- or long-fiber-reinforced SiC ceramic, in order to achieve higher rigidity or better binding to tools, may form an underlayer on which hard material particles may be arranged and fixed.

SiC-bound hard material particles or components can advantageously be used as abrasive grains, for the production of abrasive media, with hard material particle-reinforced components for protection and applications for wear protection, as abrasive medium, mounted point or for protection and antiwear applications.

DESCRIPTION OF THE DRAWINGS

The invention is to be elucidated in detail hereinafter by examples.

The figures show.

DETAILED DESCRIPTION OF THE INVENTION

Figure 1:
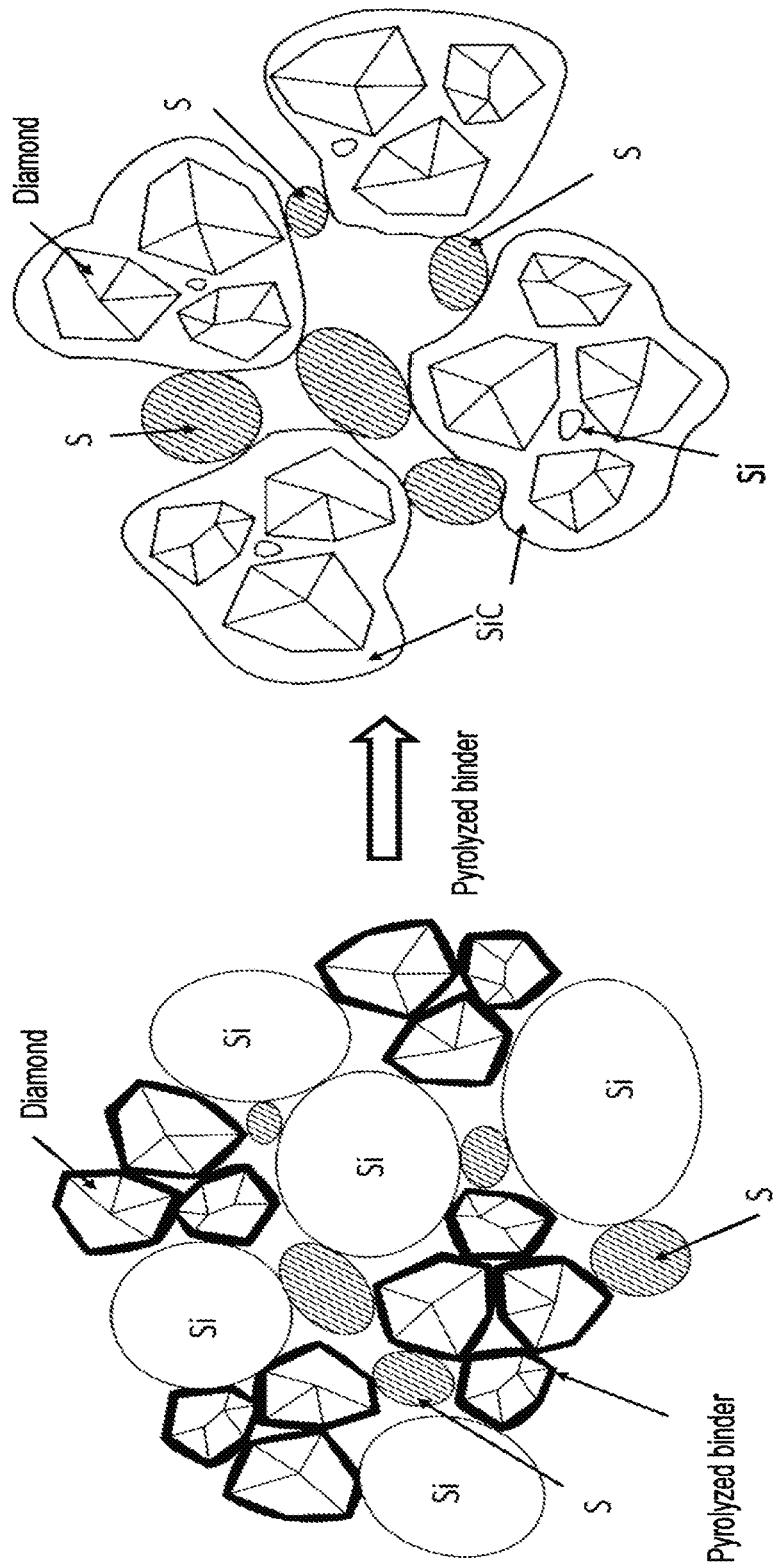
FIG. 1 in schematic form, means of production of SiC-bound hard diamond material particles, and FIG. 2 in schematic form, means of production of a component.

The left-hand drawing of FIG. 1 shows the granules consisting of diamond particles and a pyrolyzed binder (thick black outline of the diamonds). They are separated by the Si and the spacers S. This is the state prior to the silicization and reactive formation of SiC.

The silicization forms an SiC matrix incorporating the diamond particles from the pulverulent Si and vitreous carbon that has been formed in a pyrolysis at surfaces of diamond particles and partially from diamond. Even after silicization, they are separated by the spacers and therefore easily individualized.

Figure 2:
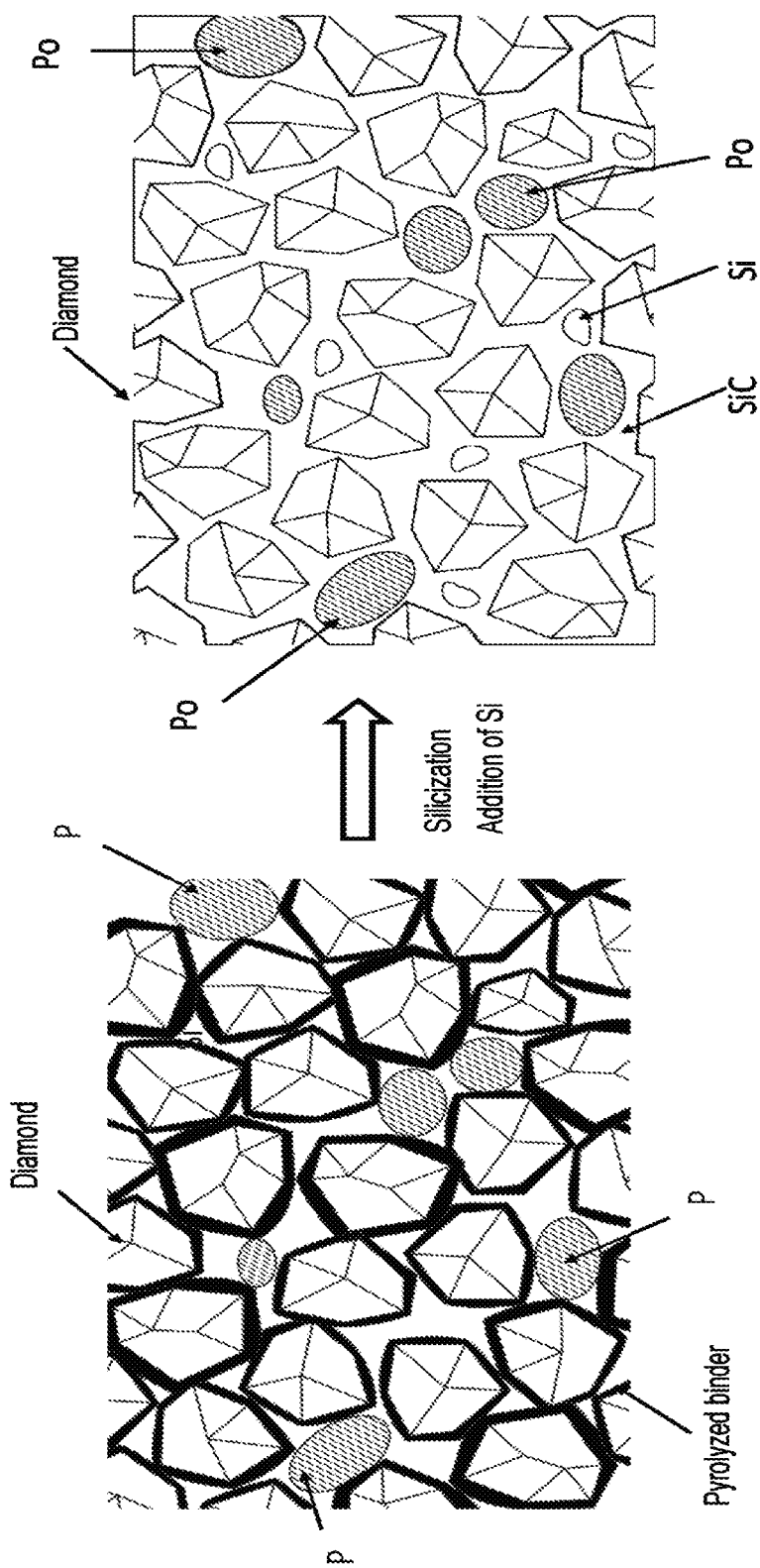

The left-hand drawing of FIG. 2 shows a shaped body composed of a mixture consisting of diamond particles having a vitreous carbon layer at their surface by means of pyrolyzed binder. Additionally present are particles P of polyurethane as pore former.

The right-hand drawing of FIG. 2 shows the state after silicization. The diamond particles are embedded in a matrix formed with SiC formed by reaction. The matrix includes islands of Si and pores Po. Si and pores Po effectively form "intended fracture sites", such that, under mechanical and/or tribological stress, diamond particles can also break out of the component material together with SiC residues and hence can achieve adaptation to abrasive or tribological requirements during use. At the same time, the pores can serve as a reservoir for abrasives or coolants or additional abrasive media.

Example 1

For the production, diamond powder having a median particle size $d_{50}$ of 50 µm is granulated together with an organic binder. The diamond powder is mixed here with the organic binder in aqueous form or in a solvent and agglomerated by means of a granulation technique (e.g. spray granulation, fluidized bed granulation, buildup granulation, etc.). Granular material thus obtained has an average particle size of 500 µm. The granules produced are subsequently pyrolyzed under Ar atmosphere at 800° C., with the conversion of the organic constituents of the binder to a vitreous carbon. This vitreous carbon functions as binder phase between the granular diamond in the agglomerates or a bed thereof, and reacts further during the reactive silicon infiltration to give silicon carbide. The silicization is conducted under vacuum conditions at 1550° C. as bulk material. For this purpose, the carbon-coated diamond granules produced are mixed with a mixture of coarse silicon powder having a median particle size $d_{50}$ of about 200 µm and a further fine fraction of pulverulent silicon having a median particle size $d_{50}$ of 10 µm. The fine fraction of the silicon powder acts here primarily as spacer, in order to prevent bridge formation between the individual granules formed with crystallized silicon and SiC. As a result, it is easily possible to individualize the SiC-bound hard diamond material particles in a jaw crusher and then to classify them once again by sieving. In this way, it is possible to produce a narrow grain size band, for example with particle sizes between 450 µm and 550 µm.

The SiC-bound hard diamond material particles consist of diamond and silicon carbide formed by reaction, and residual silicon that has not reacted to give silicon carbide.

Example 2

For production of hollow granular bead material, a buildup granulation is to be utilized. For this purpose, diamond powder having a median particle size $d_{50}$ of 50 µm is dispersed with an organic binder in a suspension. Subsequently, a two-component agglomerate is obtained by means of buildup granulation, by spraying the diamond particle-containing suspension during the granulation onto coarse silicon particles having a median particle size $d_{50}$ of 100 µm during the granulation (fluidized bed granulation).

The granules obtained had a median particle size $d_{50}$ of 500 µm. The granules thus produced are subsequently pyrolyzed under a nonoxidizing atmosphere at 800° C., with the conversion of the organic constituents of the binder to a vitreous carbon. This vitreous carbon functions as binder phase between the diamond particles at the surfaces of which a coating of this vitreous carbon has formed, and this carbon reacts further during the reactive silicon infiltration to give silicon carbide.

During the final heat treatment under vacuum conditions at 1550° C., the granular material thus obtained is sylicized from the inside outward. The silicization can be assisted by adding a further fine fraction of pulverulent silicon having an average particle size of 10 µm. The fine fraction of the silicon powder acts primarily as a spacer in order to prevent bridge formation between granules consisting of diamond, crystallized silicon and SiC.

Owing to the technique of buildup granulation used, the silicization from the inside outward results in formation of hollow granular material. The granules produced consist of diamond and silicon carbide formed by reaction, and possibly residual unreacted silicon. They may be classified and used after silicization.

Residual adhering unreacted Si could be dissolved in 20% NaOH at 60° C. within 1 h while stirring.

Example 3

Porous abrasive diamond media are produced on the basis of a diamond-containing suspension. In this suspension, a bimodal diamond particle size fraction consisting of median particle sizes $d_{50}$ of 50 µm and 5 µm is used. In addition, a further solid-state component present in the suspension is a silicon powder having a median particle size $d_{50}$ of 100 µm. The spacer used is a polystyrene powder having a median particle size $d_{50}$ of 200 µm. The solids ratios of diamond to silicon to polystyrene are 2:2:1 by volume.

The binder used in the aqueous suspension is an aqueous polyvinylacetate dispersion that crosslinks on drying.

The suspension is processed and shaped by slip casting. During the final heat treatment, the diamond-containing shaped article is pyrolyzed under a nonoxidizing atmosphere at 800° C. and then reactively bound under vacuum conditions at 1550° C. In the course of pyrolysis, the organic binder is converted to a vitreous carbon with outgassing of volatile constituents. This vitreous carbon functions as binder phase between the diamond particles in the agglomerates and reacts further during the subsequently conducted reactive silicon infiltration to give silicon carbide. The polystyrene spaces are split almost completely into volatile constituents, such that these take the form of pores in an abrasive medium formed with the granular material. In the reactive binding, the silicon present in the material melts and reacts with the carbon present that has been formed from the pyrolyzed organic binder, and is deposited on diamond particle surfaces. This forms a porous diamond-SiC—Si-containing material composite that can be used as abrasive medium.

Example 4

Porous abrasive diamond media are produced here on the basis of a diamond-containing suspension. A bimodal diamond particle size fraction having diamond particles having a median particle size $d_{50}$ of 50 µm and 5 µm is used therein. Additionally present in the suspension as a second solid-state component is a silicon powder having a median particle size $d_{50}$ of 100 µm. The mass ratios of the diamond and silicon solids are 2:1.

The organic binder used in the aqueous suspension is a polyvinylacetate dispersion that crosslinks on drying. Also added to the suspension is a surfactant as foaming agent.

The suspension is foamed by means of a high-speed stir and then cast in a nonabsorptive mold and freeze-dried. The demolding is followed by the heat treatment steps. This involves pyrolyzing the diamond-containing shaped article under nonoxidizing atmosphere at 800° C., followed by reactive binding under vacuum conditions at 1550° C. The pyrolysis converts the organic constituents of the binder, with outgassing of volatile constituents, to a vitreous carbon with which surfaces of the diamond particles are coated. The reactive binding during the heat treatment melts the silicon present, and it reacts with the carbon present in the pyrolyzed binder and the diamond particle surfaces. This forms a porous diamond-SiC—Si-containing material composite.

Example 5

Porous abrasive diamond media are produced on the basis of a diamond-containing granular material. The granular material is agglomerated by means of a customary granulation technique (e.g. spray granulation, fluidized bed granulation, buildup granulation, etc.) and has an average size of 200 μm-1000 μm. The granules produced include a diamond particle size fraction having a median particle size $d_{50}$ of 50 μm, a silicon particle size fraction having a median particle size $d_{50}$ of 50 μm, and a particle size fraction of a polystyrene powder having a median particle size $d_{50}$ of 100 μm. The granular material is bound by means of a sugar-based organic binder in aqueous suspension. The solids ratios of diamond to silicon to polystyrene are 1:1:1 by volume.

The granules produced are subsequently shaped to a shaped body by a pressing operation (for example by isostatic pressing or uniaxial pressing). This is followed by pyrolysis under nonoxidative atmosphere at 800° C. This converts organic constituents of the binder, with outgassing of volatile constituents, to a vitreous carbon with which surfaces of diamond particles are coated. The polystyrene particles as spacers are split almost completely into volatile constituents, such that these are present as pores in the finished product. In the subsequent reactive binding, the silicon present in the material melts and reacts with the carbon present that has been obtained from the pyrolyzed binder, and diamond particle surfaces are coated with silicon carbide. This forms a porous diamond-SiC—Si-containing material composite.

The invention claimed is:

1. A process for producing SiC-bound hard diamond material particles wherein diamond particles are admixed with an organic binder and shaped into granules by a drying and granulation process;
    subjecting the granules to a thermal treatment in an oxygen-free atmosphere, in which organic constituents are pyrolyzed and carbon is formed in situ from the organic binder in the course of pyrolysis and deposited in vitreous form on surfaces of the diamond particles;
    performing a silicization during the thermal treatment or in a subsequent second thermal treatment with admixed pulverulent silicon and particulate spacers;
    forming silicon carbide at the same time by chemical reaction with the carbon deposited on surfaces of diamond particles and/or with the diamond particles to form hard material particles,
    wherein the diamond particles in the individual hard material particles are cohesively bonded to the SiC formed by reaction in the course of thermal treatment and the silicon so that the hard material particles are separated from one another at their surface by means of the added silicon and/or the particulate spacers, and wherein
    hard material particles are hollow on the inside and produced by applying a suspension including diamond particles and an organic binder to silicon particles having a particle size in the range of 50 μm-150 μm or
    by mixing in particles of a pulverulent organic substance that breaks down in the course of thermal treatment, the pulverulent organic substance being polymethylmethacrylate, polyurethane, polyurethane, polyethylene or polypropylene or starch and
    subsequent pyrolysis treatment, the mixing with Si powder and the particulate spacer and reactive formation of SiC are effected, wherein the proportion of the added pulverulent silicon of 10%-200% by volume, of the content of diamond particles is added.

2. The process as claimed in claim 1, wherein the spacers used are chemical elements or compounds that are not easily wetted by Si, do not form any alloy with Si and/or do not react with Si, to minimize any firm bonding of the granules to one another, where these chemical elements or compounds are selected from hexagonal BN, $Si_3N_4$, AlN, $Al_2O_3$, $SiO_2$, $ZrO_2$ and a nitride, carbide of the transition metals, of groups 4 and 5 of the Periodic Table.

3. The process as claimed in claim 1, wherein the organic binder and the amount thereof is chosen so that the organic binder used is a carbon source with a proportion between 1.5% and 20% by mass relative to the total mass of diamond particles used.

4. The process as claimed in claim 1, wherein the diamond particles are used in at least two different particle size fractions, one coarse and one fine particle size fraction the fine particle size fraction having 0.1 to 0.3 times the size of the diameter of the coarse particle size fraction and a proportion of 5% by volume of the coarse particle size fraction.

5. The process as claimed in claim 1, wherein the pulverulent silicon has a median particle size $d_{50}$ in the range of 5 μm-1000 μm, and in this range with a volume of 10%-200%, of the content of the diamond particles is added to the granulated particles prior to the silicization.

6. The process as claimed in claim 1, wherein the hard material particles are formed with at least one further phase which is selected from $B_4C$, TiC and $TiB_2$.

7. The process as claimed in claim 1, wherein the diamond particles have an average particle size of 10 μm-50 μm.

8. The process as claimed in claim 1, wherein granules are brought into a defined spherical, cylindrical, prismatic, or pyramidal shape, by extrusion or casting methods.

9. The process as claimed in claim 1, wherein the incorporation of the diamond particles or partial breakout of the diamond particles out of a matrix formed with the SiC and Si formed by reaction are influenced during mechanical/tribological stress by the maximum temperature in the silicization and the purity of the diamond particles used.

* * * * *